United States Patent [19]

Bouillot

[11] Patent Number: 4,752,908

[45] Date of Patent: Jun. 21, 1988

[54] VISUALIZABLE AND DESCRIPTIVE DATA HANDLING SYSTEM

[75] Inventor: Michel Bouillot, Nice, France

[73] Assignee: International Business Machines Corporation, Armonk, N.Y.

[21] Appl. No.: 9,587

[22] Filed: Jan. 29, 1987

Related U.S. Application Data

[63] Continuation of Ser. No. 453,020, Dec. 27, 1982, abandoned.

[30] Foreign Application Priority Data

Dec. 29, 1981 [EP] European Pat. Off. ........ 81430047.1

[51] Int. Cl.$^4$ ............................................. G06F 7/28
[52] U.S. Cl. ................................... 364/900; 340/716
[58] Field of Search ... 364/200 MS File, 900 MS File; 340/716, 717, 720, 721, 707, 710; 434/335, 337

[56] References Cited

U.S. PATENT DOCUMENTS

| | | | |
|---|---|---|---|
| Re. 32,115 | 4/1986 | Lockwood et al. | 235/381 |
| 3,292,489 | 12/1966 | Johnson et al. | 364/900 |
| 3,344,405 | 9/1967 | Craft et al. | 340/172.5 |
| 3,757,037 | 9/1973 | Bialek | 364/900 |
| 3,987,484 | 10/1976 | Bosche et al. | 360/72.2 |
| 3,997,891 | 12/1976 | Iwamura et al. | 340/707 |
| 4,028,733 | 6/1977 | Ulicki | 360/10 |
| 4,060,915 | 12/1977 | Conway | 434/338 |
| 4,190,831 | 2/1980 | Stahle et al. | 340/707 |
| 4,266,253 | 5/1981 | Matherat | 358/903 |
| 4,318,184 | 3/1982 | Millett et al. | 364/900 |
| 4,360,876 | 11/1982 | Girault et al. | 364/449 |
| 4,366,475 | 12/1982 | Kishi et al. | 340/731 |
| 4,422,105 | 12/1983 | Rodesch et al. | 358/903 |
| 4,425,581 | 1/1984 | Schweppe | 358/148 |
| 4,445,195 | 4/1984 | Yamamoto | 364/900 |
| 4,449,198 | 5/1984 | Kroon et al. | 364/900 |
| 4,485,454 | 11/1984 | Kimoto | 364/900 |
| 4,602,907 | 7/1986 | Foster | 434/337 |

FOREIGN PATENT DOCUMENTS

2449936 10/1980 France ............................. 434/307

*Primary Examiner*—Gareth D. Shaw
*Assistant Examiner*—Kevin A. Kriess
*Attorney, Agent, or Firm*—Karl O. Hesse

[57] ABSTRACT

Visualizable and descriptive data handling system including an assembly comprising a unit for reading a video disk on which images of schematic detailed layouts that can be displayed on a unit screen are recorded. A double entry table, $T_{xy}$ in memory correlates each of the image divisions of coordinates $x_iY_i$ with a memory location which itself contains the memory location address from which the descriptive data relative to the image element occupying the square, are stored. For every image, a table $T_{REF}$ of descriptive data is built through data input means, the memory address, where begin each of the descriptive data for a given image element, being recorded in table $T_{xy}$ at the address correlated with $x_iy_j$. When pointing a light pen on to the screen, the coordinates of the selected point are sent from a mini-computer which causes the descriptive data corresponding to the selected element, to be displayed upon look-up of the tables corresponding to the display image.

3 Claims, 5 Drawing Sheets

4,752,908

VISUALIZABLE AND DESCRIPTIVE DATA HANDLING SYSTEM

This is a continuation of co-pending application Ser. No. 453,020 filed on Dec. 27, 1982 now abandoned.

FIELD OF INVENTION

This invention relates to a system for handling complex information such as the information found in technical catalogues, and enabling the user to retrieve in a simple manner the information relative to portions of schematic detailed layouts.

BACKGROUND OF THE INVENTION

At present, in many fields, information is presented in catalogues such as, for example, spare parts catalogues for machines.

The complexity and variety of machines and devices now at people's disposal necessitates that these catalogues provide considerable detail of the schematic representations generally shown in the form of exploded views. In addition, all the elements of information relative to these machines (e.g., lists of components, instructions for use, prices, which are the support for current stock control and invoicing operations) require technical headings correlated with the assembly views and schematic layouts. Such information is also frequently subject to alterations as, for instance, in respect of prices, references and the like.

Therefore, a user usually has to manipulate catalogues and updates which is a tedious, time consuming operation. In addition, the user, has, in many instances, to locate various cross-references to other documents necessary to retrieve all the information he is looking for: prices, technical reference, instructions for use, etc.

At this stage, when considering the usual handling of such elements of information for invoices and stock control purposes, etc., manual retrieval is a hindrance. Current procedures have to be initiated through a manual preparatory collection of the various references necessary for each element and this, of course, entails the possibility of error.

The suppliers of such catalogues, tariffing and technical headings have to effect continuous up-dating and distribution, which entails costly editing and printing operations.

PRIOR ART

Many systems are known which are adapted to display digital and alphabetical data but which are not adapted to display a complex image; as to the graphical data display systems, they require significant central units, large scale memories. In view of the high costs thereof, small firms, such as, for instance, spare parts shops, or the like, cannot afford such systems.

Those systems which make use of videodisks can have graphical (images) and alphanumerical information memorized, but it is difficult to alter digital information and, as a consequence, their use in building and maintaining catalogues, and in tariffing operations, is difficult to conceive.

SUMMARY OF THE INVENTION

In view of the above, one object of this invention is to provide a system for handling information, more specifically the pictorial information, contained in catalogues.

Another object of this invention is to achieve such a system which is easy to manipulate.

Such a visualizable and descriptive information handling system with easy retrieval of the data relative to portions of schematic detailed layouts, includes: first display means for displaying onto a screen, images of schematic detailed layouts, such means including, in a preferred embodiment, a playing unit for reading a video record such as a disk or a tape, on which images of the schematic detailed layouts are recorded, and a display screen terminal associated with a keyboard and a light pen; an input/output bus and a control bus to which said first means are connected, and a mini-computer or microprocessor associated with at least one memory, the microprocessor and the memory being connected to the input/output and control busses; the memory including, in addition to the control program of the system, at least two correspondence tables for each image. One of the tables contains the descriptive information relative to each of the image elements, in memorized address positions determined upon creation of such a table. The other table is comprised of as many elements as there are partitions on the screen; this correspondence table is used for the correlation between the coordinates of the displayed images and the address positions in the first table. When a wanted image is selected by means of a control signal sent through the keyboard, (in the preferred embodiment,) it is displayed on the screen, and the microprocessor in response to the control signal sent by a light pen pointing to a selected image element of the screen, causes the memorized data relative to this element to be displayed, after looking-up the tables.

Such a system according to the present invention includes a magnetic recording such as a cassette or magnetic diskette, containing the correspondence tables of the images, which can be loaded into the memory of a user's system.

DISCLOSURE OF THE INVENTION

A system according to the present invention includes a microprocessor or mini-computer associated with input/output devices. The mini-computer or microprocessor can be of the IBM "Personal Computer" type which is comprised of the following elements: a microprocessor INTEL* (*trade mark) 8088, 1, with a 4.77 MHz internal clock, a random access memory RAM 2 with a capacity up to 256 kilo-bytes (1 byte = 8 bits), a 250 ns access time, a 410 ns cycle, a read-only memory ROM 3 with a capacity of 40 kilo-bytes which contains the Microsoft Basic-80 support program for fulfilling the functions of the system and managing the peripheral units which are connected thereto.

Figure 1:
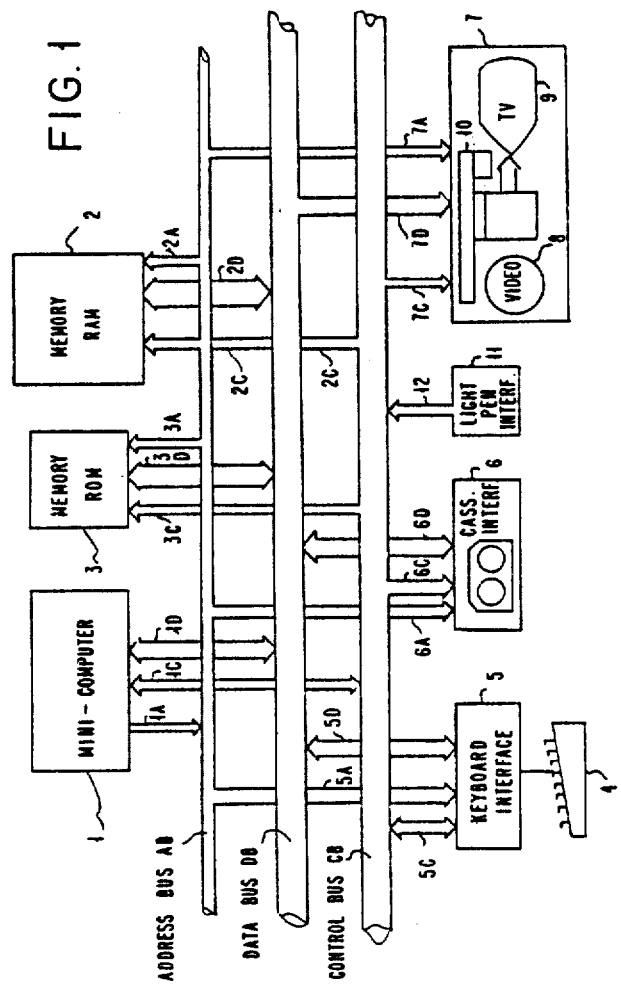
FIG. 1 is a schematic representation of the system according to the invention.

In a conventional way, this mini-computer communicates with peripheral units, through address, data and control busses, AB, DB, CB, respectively. They are shown separately, in FIG. 1.

The input/output units include: a keyboard 4 associated with an interface 5, this keyboard including alphanumerical keys for sending messages, and dedicated or function keys operable to permit an operator to carry out specialized controls. The interface transforms the signals sent through the keyboard into appropriate signals which can be conveyed over the bus.

Another element 6 is a magnetic cassette unit associated with an interface connected also to the busses.

An assembly 7, comprises a playing unit 8 for reading a video support such as a disk, and a display unit 9 for providing a display on a television screen, messages coming from the data bus or information read out of the video disk. Such an assembly 7, therefore, is connected to the control, data and address busses in order to receive, from the keyboard, control signals such as, for instance, disk drive signals, and to receive data to be displayed. An interface 10 is provided so as to make the data conveyed on the bus compatible with the signals acceptable by unit 9 and so that screen scanning counters can be read in a manner to be disclosed hereinafter.

A light pen 11 permits the operator to communicate with the system. As it is pointed to a selected location on the screen, its photoelectrical cell is energized by the light flux created by an electron beam in passing over this location on the cathode ray tube. Such energization, after validation, is transmitted in the form of pulses to a device interfacing the mini-computer, via control bus 12. Microprocessor 1 is advised of this signal, through an interrupt request.

The program in charge of handling such an interruption sends controls to screen interfacing device 10, which cause the scanning counters to be read. With these values, and through a table look-up mechanism in memory 3, the square on the screen pointed out by the light pen, is determined.

The busses which connect the different elements to busses AB, DB, CB are referred to by the reference number of the element followed with letter A, D and/or C which indicate whether an address, a data or a control bus is concerned, respectively.

The system of this invention is utilized in order to carry out the following types of operation:
1. editing the supports for video information and description, and
2. consulting the supports for data retrieval.

These two operations are carried out under the control of an editing program and a consulting program the flow charts of which will be given further on.

In conformity with this invention, the video supports, video disks in the preferred embodiment, are created by taking a succession of images by means of a video camera.

The first image of the disk is representative of the heading and information identifying the disk content. The second image is representative of the table of contents which will enable the operator to select a desired view. These images are then followed with images of the exploded views of the different machines. Each layout has an identification key which is the reference of the machine concerned. Once the video support is created, it is then necessary to gather all the elements of information relative to the image that will be required by the operator-customer. These elements of information will be in the magnetic cassette which may be read or written, through device 6.

Figure 2:
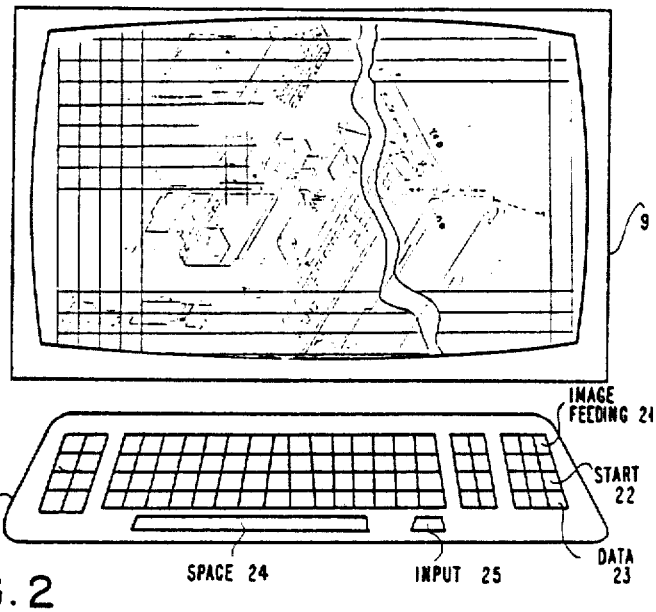
FIG. 2 is a schematic diagram of the screen onto which an image is displayed.

The proposed system makes use of a processing method for processing an image and the associated data, the screen and the image being virtually divided into a plurality of squares, as disclosed further on in reference to FIG. 2. The image may be created in conformity with such a division the focalization thereof being achieved by means of a viewing lens reproducing the squaring.

In this way, it is sure that each of the components of the layout occupies a different square on the projected image.

These elements of information are of two types, namely;
 (a) the topographical description of the image when it is projected on to the screen, which will be, for the system table I illustrated in FIG. 3 and used by the correlation mechanism for correlating the coordinates $x_i$ and $y_j$ corresponding to a square of the image, with a memory location containing the information that corresponds to the particular element in this square. The image is divided into a plurality of squares of coordinates $x_i$ $y_j$ which form a grid such as schematically shown in FIG. 2, and,
 (b) the lists relative to each of the image parts having allocated memory addresses where they will be loaded.

The method of creating such tables will make use of the system according to this invention, an edition program being run in the memory.

The keyboard at the operator's disposal is alphanumeric and includes function keys which each have a specific function.

An "image feeding" key, when depressed by the operator, will cause successive images to be retrieved on the video disk, read by unit 8, and to be displayed on the screen of unit 9; reading the reference key associated with each of such images makes it possible to retrieve the corresponding information on the cassette.

A "start" key informs the system that the operator who has acknowledged the displayed image, will proceed to some operations. Depending on whether the system will be used for an editing or a consulting operation, different actions will be started by different programs described further on.

The video disk so created is positioned on unit 8 and the cassette which corresponds thereto is inserted into unit 6. The operator in charge of the editing, who will be called hereinafter the editor, keys the information, description, headings, etc., which are recorded at the beginning of the cassette.

The editing process will now be described with reference to FIGS. 2 and 3.

When depressing the "image advance" key 21, on keyboard 4, the editor selects the image he desires. Then, he depresses the "start" key 22. The identification key REF X which is with the image on the video disk, is written into the cassette either directly or may be keyed in by the editor.

Figure 3:
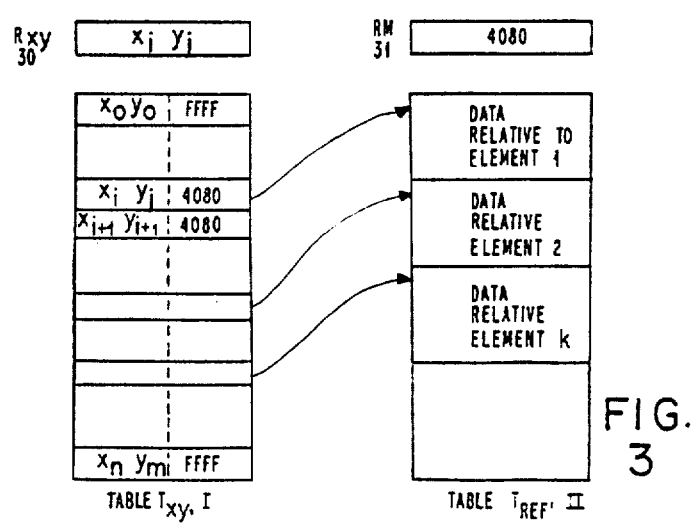
FIG. 3 illustrates the different tables which are generated from the screen image of FIG. 2 by an operator's use of the keyboard.

The editing program will now build the correspondence tables I and II of FIG. 3 by prompting the editor.

The screen of unit 9 may be considered as an assembly of virtual squares, a schematic representation thereof being shown in FIG. 2.

Building table I consists in allocating to each square of coordinates $x_i$ and $y_j$, the memory address where is loaded the information relative to the element occupying this square. The program under the control of the editor flags an indication, such as for instance FFFF, which is meant for an empty field in regard to an image element for which there will be no correspondence in the memory.

When an image element occupies several squares, those squares are all associated with the same address position.

Therefore, the program will handle two address registers in memory 2, namely a "squares addresses" register 30 and a "memory" register 31 schematically shown in FIG. 2. Register 30 is related to squares $x_i$ $y_j$, and register 31 handles the addresses of the allocated memory locations.

When the address register is set to 1 by program, at the beginning of the operation, the program causes a cursor to be projected upon the image in that zone which corresponds to square 1 of coordinates $x_o$ $y_o$ as well as a message prompting the editor to key in the information he desires to be recorded.

When the location on the screen happens to be empty, the editor depresses "space" key 24. The chosen flag FFFF will be written into table I. Register 30 is incremented, the cursor is moved to the following square and the editor is prompted again.

When this new location contains an element that the editor wants to reference, he depresses "data" key 23 and keys in the information he wants to record. This information is translated into an internal code, such as for instance, into EBCDIC code, and is loaded from the address in register 31 which is incremented each time a location has been utilized. The start address is written into table I facing the position of the concerned square.

Once the editor has finished to key in the data; he depresses "input" key 25 which causes the data to be stored in the memory.

The procedure goes on square after square until all the screen has been scanned.

At this point in time, the two tables I and II are built up, and they are transferred from memory 2 into the cassette just after the reference key of the image involved.

The second image that contains the table of contents is handled the same way as for the images of the exploded views, i.e., the two correspondence tables $T_{xy}$ and $T_{REF}$ are generated. Contrary to a table associated with a layout, table $T_{REF}$ will not contain descriptive information but rather the sequence number on the disk of each of the images listed in the table of contents.

Figure 4:
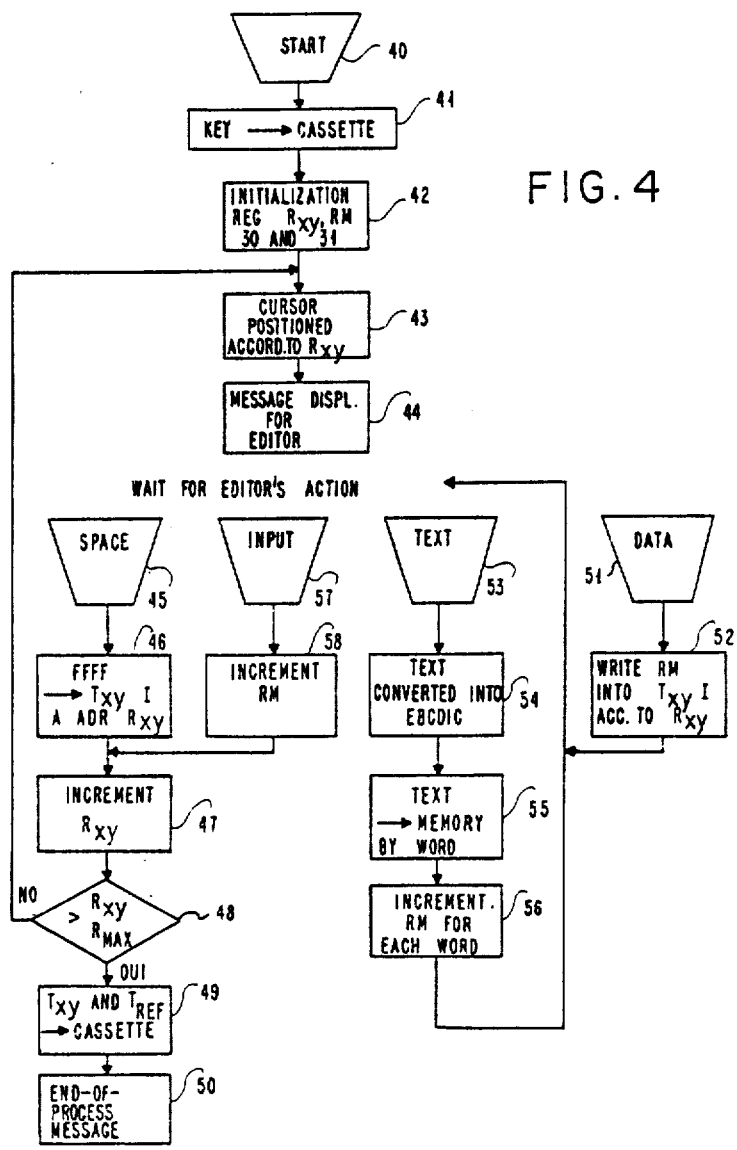
FIG. 4 is a flow chart of the editing program.

The flow chart of the editing program is shown in FIG. 4. When "start" key 22 is depressed, step 40, the program confirms the choice of the image and, at step 41, it causes the reference key recorded on the video disk to be entered in the cassette. At step 42, the address registers $R_{xy}$ 30 and RM 31 are initiated, register $R_{xy}$ is set to 1, and RM is loaded with the address of the first location available in the memory. At step 43, an order for positioning the cursor according to the value of $R_{xy}$ is sent; at step 44, a message is displayed on the screen, which prompts the editor.

When the editor depresses "space" key 24, the program detects this operation, step 45, and causes FFFF to be written into table $T_{xy}$ I at the address contained in register $R_{xy}$ 30, step 46. At step 47, register $R_{xy}$ 30 is incremented. At step 48, the contents of register $R_{xy}$ is tested to determine whether the last square of the coordinate values $x_m y_m = R_{Max}$ has been reached. When $R_{xy}$ is lower than $R_{Max}$, the program comes back to step 43.

When $R_{xy}$ is equal to $R_{Max}$, the program at step 49 causes tables $T_{xy}$ and $T_{REF}$, I and II, to be recorded in the cassette, and then, at step 50, sends a message to the editor which is indicative of the end of the current image processing.

When the editor depresses "data" key 23, the program detects this operation, step 51; at step 52, it causes the contents of register RM to be written into table $T_{xy}$ I according to the address in register $R_{xy}$ and waits for the editor's action. When he depresses the alphanumerical keys for writing the text, the operations are detected, step 53. The text is converted into an internal code, step 54, and it is stored in memory by word, step 55, according to the contents of register RM 31. Register RM 31 is incremented (step 36) upon each memory word. When the editor has completed the keying of the alphanumerical information, he depresses "input" key 25. This operation is detected at step 57, register RM 31 is incremented, and step 47 is operated in order to pass to another square on the screen.

Figure 5:
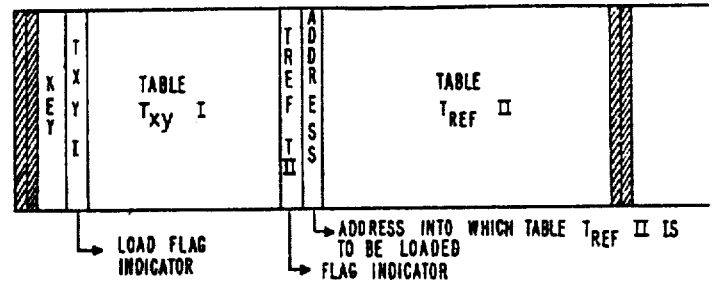
FIG. 5 is an arrangement of the magnetic tape records in the cassette.

The magnetic tape in the cassette obtained after preparing the images, is organized as shown in FIG. 5. It is segmented after each of the images. A special indexing code is recorded at the beginning of the information corresponding to an image in order to simplify retrieval, and, a reference field is used for correlation with the projected image, which field will include the reference key.

Then, follows table $T_{xy}$ I of fixed length since it corresponds to all the squares on the screen, and table $T_{REF}$ II with its load address.

Once the video and magnetic supports are created, they can be distributed to the different users who will be able to consult them as follows for retrieving desired information.

Once the video and magnetic supports are loaded into units 8 and 6, respectively, the first image, then the second image, are presented to the user operator. The tables corresponding to this second image which are placed at the beginning of the cassette, are sent into memory RAM 2 and the operator can point out the view for retrieval on the screen by means of a light pen. The sequence number of the image is read from the correspondence tables and transmitted to the display unit interface device 10 in order to control the disk positioning. When the operator desires, this operation can be carried out manually. When the desired image has been selected, the initiator depresses "start" key; the reference key makes it possible to retrieve the information corresponding to this image in the cassette, information which is in the form of the two tables $T_{xy}$ I and $T_{REF}$ II. These tables are transferred to memory in their respective load addresses.

Thus, the system is initialized and the operator who makes use of it can indicate which object he is interested in by means of a light pen. The position of the light pen on the screen is detected by reading the scanning counters. The translation mechanism supplies coordinates $x_i$ $y_j$ of the corresponding square which, when applied into $T_{xy}$, give the memory address in $T_{REF}$ where is the information under retrieval.

At this stage, many applications are possible, such as stock control, accountancy, etc.

Figure 6:
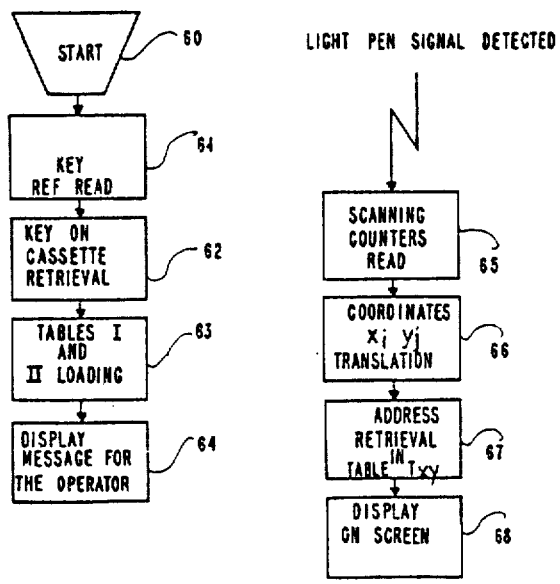
FIG. 6 is a flow chart of a consulting program for retrieving selected information, and, FIG. 7 is a schematic diagram of unit 7 in FIG. 1.

The flow chart of the consulting program is shown in FIG. 6.

When "start" key 22 is depressed, this operation is detected by the program at step 60. The reference key is read, step 61. The tape in the cassette is run in order to retrieve this reference key, step 62. Then, tables $T_{xy}$ I and $T_{REF}$ II are loaded into the memory, step 63. A message is displayed for the operator, which indicates that the retrieval of the information relative to one object, can be started, step 64.

The operator points the light pen to a point on the screen. The detection of the corresponding signal causes the scanning counters to be read, step 65. This information is translated into the square coordinates $x_i$ $y_j$ of the selected object, step 66, which, when applied to table I, give the memory location address containing the information relative to this object, step 67. The corresponding memory location is addressed and read, and the information is displayed on the screen, step 68.

Assembly 7 will now be described with reference to FIG. 7.

This assembly is comprised of the reading unit for reading of video disk 8 symbolically illustrated by a circle, with manual controls 70 for the mechanical control of the disk: start/stop, drive, etc., and of control circuits 71 which receive the orders over busses SB and CB, through interface 10 in order to start operating the disk and stop it onto an image.

Interface 10 is a conventional logical circuit for making the connection to busses AB, DB and CB in order to fulfill the following functions:

(a) Detection of the address of assembly 7 when it is on the address bus AB and is being transmitted to the interface, through bus 71, (b) Interception of the controls on bus 7C and of the messages, on data bus 7D. The controls are as follows:

(i) disk positioning order, end-of-disk control, which are sent to control circuits 71 for controlling the disk drive and servo operations, (ii) formatting of the messages to be displayed, and order for positioning the cursor onto the screen of display unit 9, (iii) reading of the scanning counters 72 the contents of which are transmitted to interface 10, in order to be sent over data bus 7D to the minicomputer which will cause these values to be translated into coordinates $x_i$ $y_j$ after looking-up of the tables in memory 3.

The messages to be displayed from bus 7D are stored in register 73. A signal mixer 74 enables those messages which are to be displayed on the screen of unit 9 to be superimposed to the image read from the disk.

The above-disclosed preferred embodiment of this invention makes use of the video disk as a support to the visual information.

Keeping in mind the same image creation principle and the use of the topographical description of this image by translation mechanisms, a system according to this invention can also be implemented with slides or photographic films used as alternate visual information supports.

The equivalent of the functions produced by the cathode tube and the light pen may be obtained by using, as a projection screen for the slide or the film, a graphic table of the graf-pen type disclosed on page 130 in the book: "Image et ordinateur-introduction a l'infographie interactive" by Pierre Morvan et Michel Lucas, Larousse editions. The plate is a mere plate made of frosted glass the dimensions of which can be very large, which is an advantage with respect to the TV screen. The light pen is replaced by a pen which produces ultrasounds, when applied upon the plate. Audio detectors arranged on the edges of the plate collect these ultrasounds and locate the position of the emitter. A counter is allocated to each coordinate and the counting operation is started when a sparkle is produced, and is stopped when the wave edge is detected. The messages sent to the operator will be visualized on a small control screen, such as for instance, the screen of the "IBM Monochrome Display" unit or on a commercially available television set, through a radio frequency modulator RF.

The advantage of this embodiment is that one can make use of a large size screen and that messages can be displayed on numerous control screens. Consequently, applications can be envisaged for any airport, town, industrial emplacement control installations operating with maps, electrical circuits, etc.

I claim:

1. In an information retrieval terminal of the type having an image selection input, an image display, and an image media reader for reading video images, the improvement comprising:

a partition selector for selecting one of a plurality of partitions into which the viewing screen of said display is divided, said display indicating on said display screen, which of said partitions has been selected;

a text media reader for reading correspondence tables and encoded text information from an easily changed text media;

several entries in said correspondence table related to said selected image containing a same address where the encoded text information corresponding to several partitions of said selected image being displayed in said several partitions of said screen is stored;

an entry in said correspondence table corresponding to a selected partition contains a null address character indicating that said selected partition has no corresponding text description;

a programmed computer connected to said partition selector, to said text media reader, to said image selection input, to said image media reader and to said display, said computer being responsive to a selection of one of said images by an operator using said image selection input for displaying said selected image on said display and said computer being responsive to a selection of one of said partitions by said operator using said partition selector for reading from a correspondence table related to said selected image, at an entry corresponding to said selected partition, an address where encoded text information related to the portion of said selected image being displayed in said selected partition is stored, and for converting and displaying said encoded text information as alphanumeric characters.

2. An information input terminal comprising:

an image selection input;

an image display;

an image media reader for reading video images from image media;

a partition selector for selecting one of a plurality of partitions into which the viewing screen of said display is divided, said display indicating on said display screen, which of said partitions has been selected;

a plurality of function keys for controlling text input;

a keyboard for entering text;

a text media encoder for writing correspondence tables and encoded text information onto text media;

a programmed computer connected to said image selection input, to said display, to said image media reader, to said partition selector, to said function keys, to said keyboard, and to said text media encoder, said computer being responsive to a start function key and to a selection of one of said images by an operator using said image selection input for displaying said selected image on said display and said computer being responsive to a selection of one of said partitions by said operator using said partition selector for writing into a corresponding table related to said selected image, at an entry corresponding to said selected partition, an address where encoded text information related to the portion of said selected image being displayed in said selected partition will be stored, and for encoding and storing said encoded text information as alphnumeric text characters are entered by said operator at said keyboard;

said computer being responsive to a function key to write a same address into several corresponding entries in said correspondence table when the same encoded text information corresponds to several partitions of said selected image; and said computer being responsive to a function key to write a null address character at an entry in said correspondence table corresponding to a selected partition that has no corresponding text description so that no encoded text information corresponding to said portion of said selected image being displayed in said selected partition is stored.

3. The method of retrieving and displaying text information related to a portion of an image selected by an operator which comprises the steps of:

(1) displaying to said operator on a screen having a plurality of partitions, a first image which is a table of contents;

(2) responding to selection by said operator of one of said partitions of said screen to read from a first correlation table, the image ID of the image corresponding to the entry in said table of contents being displayed in said selected partition;

(3) reading from an image media, a selected image which is the image identified by said image ID;

(4) reading from a text media, a correspondence table corresponding to said selected image and storing said correlation table in a memory of a computer;

(5) displaying said selected image on said screen;

(6) responding to a first selection by said operator of one of said partitions of said screen to read from said correspondence table stored in said memory, an address where encoded text information corresponding to the portion of said selected image being displayed in said selected partition is stored;

(7) using said address to read said encoded text information stored at said address if said address is not a special address indicating that no description of said image is stored corresponding to said selected partition;

(8) generating alphanumeric characters descriptive of said encoded text information and displaying said characters to said operator;

(9) responding to a second selection by said operator of a second one of said partitions of said screen to read from said correlation table stored in said memory, said address where said encoded text information corresponding to the portions of said selected image being displayed in each of said first and said second selected partitions is stored;

(10) reading said encoded text information stored at said address;

(11) generating alphanumeric characters descriptive of said encoded text information and displaying said characters to said operator.

* * * * *

UNITED STATES PATENT AND TRADEMARK OFFICE
CERTIFICATE OF CORRECTION

PATENT NO. : 4,752,908
DATED : June 21, 1988
INVENTOR(S) : Michel Bouillot

It is certified that error appears in the above-identified patent and that said Letters Patent is hereby corrected as shown below:

In Claim 2, col. 9, lines 16 and 17: Change --corresponding-- to correspondence.

Figure 7:
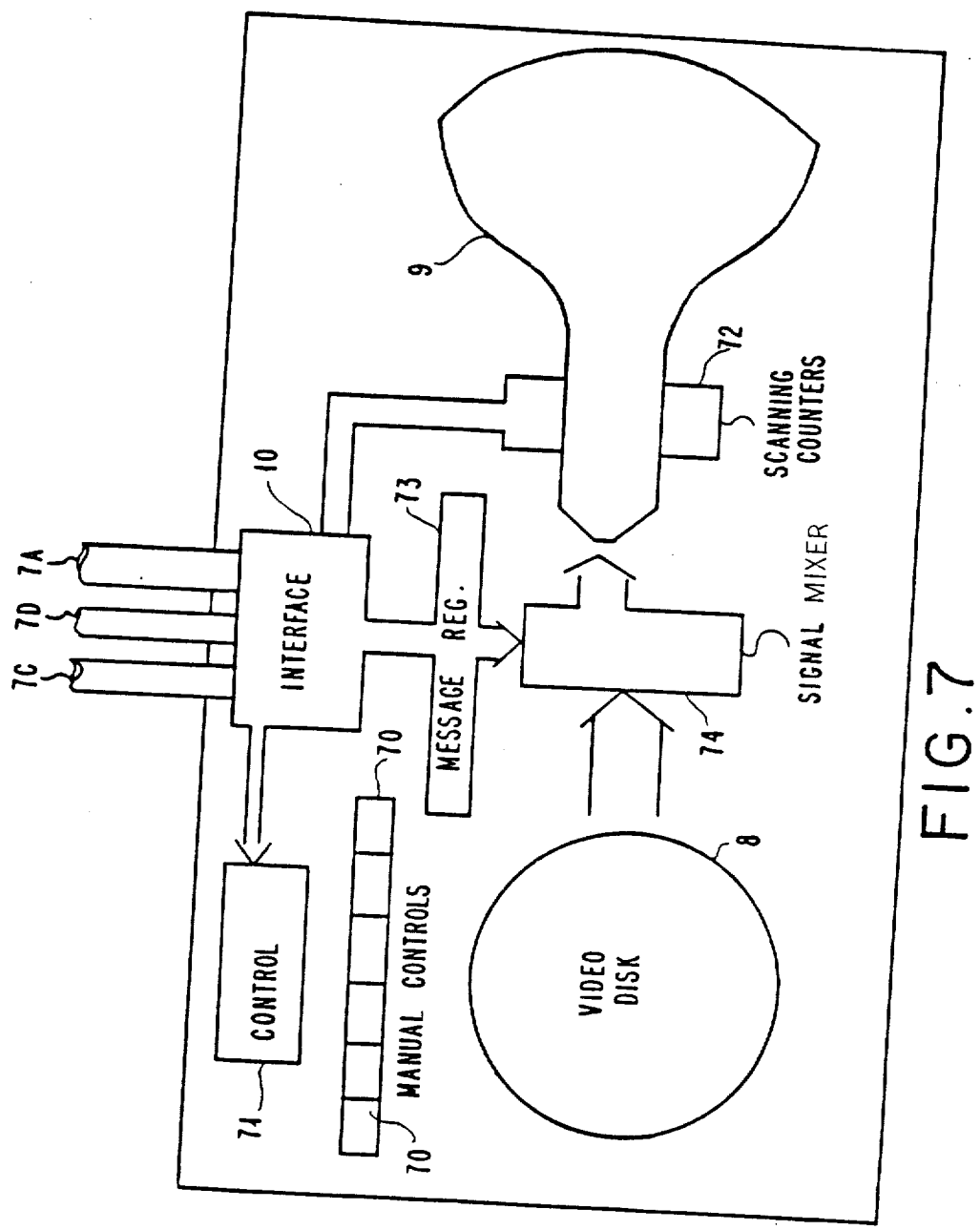

Insert Fig. 7 as part of Letters Patent as shown on the attached sheet.

Signed and Sealed this

Twentieth Day of June, 1989

Attest:

DONALD J. QUIGG

Attesting Officer

Commissioner of Patents and Trademarks